(12) United States Patent
Ayyagari et al.

(10) Patent No.: US 9,916,360 B2
(45) Date of Patent: *Mar. 13, 2018

(54) JOINING OPERATIONS IN DOCUMENT ORIENTED DATABASES

(71) Applicant: International Business Machines Corporation, Armonk, NY (US)

(72) Inventors: Phani Kumar V U Ayyagari, Hyderabad (IN); Manish A. Bhide, Hyderabad (IN); Bhavani K. Eshwar, Bangalore (IN); Purnachandra R. Jasti, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,718

(22) Filed: Dec. 13, 2016

(65) Prior Publication Data

US 2017/0109407 A1 Apr. 20, 2017

Related U.S. Application Data

(63) Continuation of application No. 14/886,517, filed on Oct. 19, 2015.

(51) Int. Cl.
*G06F 17/30* (2006.01)

(52) U.S. Cl.
CPC .. *G06F 17/30522* (2013.01); *G06F 17/30011* (2013.01); *G06F 17/30454* (2013.01); *G06F 17/30477* (2013.01); *G06F 17/30498* (2013.01)

(58) Field of Classification Search
CPC ......... G06F 17/30522; G06F 17/30011; G06F 17/30477; G06F 17/30454; G06F 17/30498
USPC ........................................................ 707/691
See application file for complete search history.

(56) References Cited

U.S. PATENT DOCUMENTS

| 5,680,603 | A | 10/1997 | Bhargava et al. |
| 7,149,737 | B1* | 12/2006 | Luo .................. G06F 17/30498 707/704 |
| 7,539,660 | B2 | 5/2009 | Focazio et al. |
| 8,078,645 | B2 | 12/2011 | Singh |
| 8,402,016 | B2 | 3/2013 | Tsirogiannis et al. |
| 8,903,872 | B1 | 12/2014 | Weissman |
| 9,058,358 | B2* | 6/2015 | Matsuda .......... G06F 17/30498 |
| 9,286,595 | B2* | 3/2016 | Taneja ................ G06Q 10/063 |

(Continued)

OTHER PUBLICATIONS

US 9,002,784, 04/2015, Matsuda et al. (withdrawn)

(Continued)

*Primary Examiner* — Kris Mackes
*Assistant Examiner* — Tiffany Bui
(74) *Attorney, Agent, or Firm* — Gilbert Harmon, Jr.

(57) ABSTRACT

An approach for joining operations on document-oriented databases. The approach consists of receiving database identifiers, common attributes and results attributes for core and target databases being joined. Common attributes are searched for in the databases. The searches performed include string, expansive, character and nested. Common attribute join conflicts are identified and input is received to resolve attribute join conflicts. Resolved join conflicts are updated in a join substitution database for subsequent use and joined data results are output to virtual table(s).

1 Claim, 4 Drawing Sheets

(56) References Cited

U.S. PATENT DOCUMENTS

| | | | |
|---|---|---|---|
| 9,418,106 B1 | 8/2016 | Ayyagari et al. | |
| 9,679,012 B1* | 6/2017 | Dorin et al. | |
| 2002/0038308 A1* | 3/2002 | Cappi | G06F 17/30566 |
| 2005/0091199 A1* | 4/2005 | Focazio | G06F 17/30595 |
| 2007/0233641 A1 | 10/2007 | Chong et al. | |
| 2010/0010960 A1 | 1/2010 | Singh | |
| 2011/0209007 A1* | 8/2011 | Feng | G06F 11/0709 |
| | | | 714/48 |
| 2012/0102472 A1 | 4/2012 | Wu et al. | |
| 2014/0201126 A1* | 7/2014 | Zadeh | G06K 9/627 |
| | | | 706/52 |
| 2014/0280065 A1 | 9/2014 | Cronin et al. | |
| 2016/0055233 A1 | 2/2016 | Wang et al. | |
| 2016/0350369 A1* | 12/2016 | He | G06F 17/30454 |

OTHER PUBLICATIONS

Ayyagari et al., "Joining Operations in Document Oriented Databases", U.S. Appl. No. 14/886,517, filed Oct. 19, 2015, 31 pages.
Ayyagari et al., "Joining Operations in Document Oriented Databases", U.S. Appl. No. 15/375,703, filed Dec. 12, 2016, 28 pages.
IBM Appendix P, list of patents and patent applications treated as related, Dec. 12, 2016, 2 pages.

* cited by examiner

```
                                    200
                                  /
    202
      \  {
        -"Firstname" : "",     204
    206                       /
       -"Lastname" : " ",
                              208
    210 -"address" : " ",    /
       -"office_number" : " ",
       -"residence_number" : " "    212
                                    /
        "permanent_account_number" : " "
        }
```

FIG. 2A

```
                                    220
                                  /
    222
      \  {
        -"name" : {
              "firstname" : " ",
              "l_name" : " ",
    224
       \      }
        -"address": " "        226
         "phone_number :     /
              {
                  "office_number" : " ",   228
                  "home_number" : " "     /
    230       }
       \ -"pan" : " "
         }
```

FIG. 2B

JOINING OPERATIONS IN DOCUMENT ORIENTED DATABASES

BACKGROUND OF THE INVENTION

The present invention relates generally to the field of joining tables in database queries, and more particularly, to the joining of fields that are similar in document-oriented databases.

Join operations on relational databases are useful to extract the required data that spreads across multiple normalized databases. To perform join operation, a common attribute or field is selected in the databases of interest and used to create a virtual table with desired field values from the joined databases. Unlike relational databases, non-relational database join operations generally do not share standard database schema definitions. Non-relational databases, known as document-oriented or 'NoSQL' databases have database schemas characterized as 'dynamic' and are often nested or hierarchically defined. NoSQL queries often only access fields that have the related document schema as joining data tables is established using exact matching of common field names between documents.

SUMMARY

As disclosed herein, a computer system for joining operations on document-oriented databases, the computer system comprising: one or more computer processors; one or more non-transitory computer readable storage media; program instructions stored on the one or more computer non-transitory readable storage media for execution by at least one of the one or more computer processors, the program instructions comprising: program instructions to, receive a plurality of database identifiers for joining each of a core database and one or more target databases; program instructions to, identify the core database and the one or more target databases based on the plurality of database identifiers, respectively; program instructions to, receive one or more common attributes associated with the core database; program instructions to, receive one or more results attributes for generating combined join results; program instructions to, search for the one or more common attributes and the one or more results attributes in the core database and the one or more target databases, wherein searching comprises: program instructions to, determine a replacement attribute for at least one of the one or more common attributes based on one or more join substitution data stores, and the searching further comprises: one of one or more string search, one or more character search, one or more expansive search wherein the one or more expansive search comprises searching based on the replacement attribute, the replacement attribute determined based on one or more expansion terms data stores, and one or more nested search traversing a core database schema levels and one or more target databases schema levels, using the one or more string search and at least one of the one or more character search and the one or more expansive search; program instructions to, update the one or more join substitution data stores by receiving input to resolve one or more common attribute join conflicts; program instructions to, update the one or more expansion terms data store based on user input; program instructions to, identify the one or more common attribute join conflicts wherein the one or more common attribute join conflicts comprise multiple combinations to join attributes; program instructions to, create one or more choices for each of the one or more common attribute join conflicts based on searching for one or more matching join conflict resolutions in the one or more join substitution data stores based on each of the one or more common attribute join conflicts and one or more matching join conflict resolutions; program instructions to, output the one or more choices for one or more choice selections; program instructions to, receive the one or more choice selections as a second one or more common attribute join conflict resolutions, to resolve the one or more common attribute join conflicts; program instructions to, store the second one or more common attribute join conflict resolutions in the one or more join substitution data stores and program instructions to, output one or more virtual tables wherein the one or more virtual tables comprises the combined join results based on the one or more common attributes and the one or more results attributes from the core database and the one or more target databases.

BRIEF DESCRIPTION OF THE DRAWINGS

FIGS. 2A, B depicts sample JavaScript Object Notation (JSON) databases for an example joining operation, in accordance with an embodiment of the present invention;

DETAILED DESCRIPTION

Embodiments of the present invention provide systems, methods and computer program products for performing join operations in document-oriented databases where database schema definitions are not matching and/or when field names differ between documents. The approach provided, supports joining of inexact attribute names at equal or different levels in nested document-oriented structures.

Embodiments of the present invention will now be described in detail with reference to the figures. It should be noted that, references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
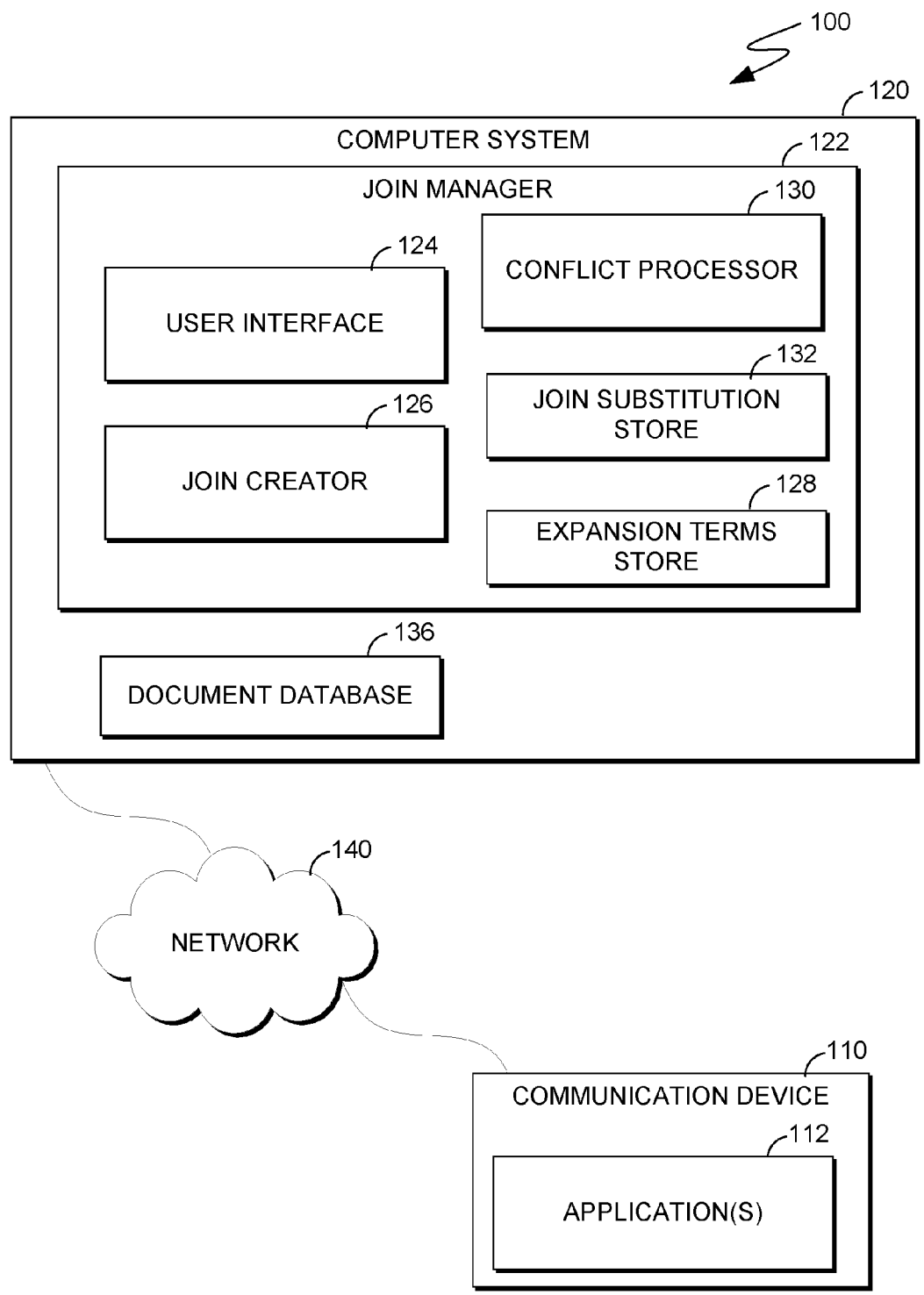
FIG. 1 is a functional block diagram illustrating a computing environment, in accordance with an embodiment of the present invention.

FIG. 1 is a functional block diagram of computing environment 100, in accordance with an embodiment of the present invention. Computing environment 100 comprises communication device 110, and computer system 120, interconnected via network 140. Communication device 110 and computer system 120 can be desktop computers, laptop computers, specialized computer servers, or the like. In certain embodiments, communication device 110 and computer system 120 represent computer systems utilizing clustered computers and components acting as a single pool of seamless resources via network 140. For example, such embodiments can be used in data center, cloud computing, storage area network (SAN), and network attached storage (NAS) applications. In general, communication device 110 and computer system 120 are representative of any electronic devices, or combination of electronic devices, capable of executing computer readable program instructions, as described in detail with regard to FIG. 4.

Network 140 can be, for example, a local area network (LAN), a wide area network (WAN) such as the Internet, or a combination of the two, and include wired, wireless, or fiber optic connections. In general, network 140 can be any combination of connections and protocols that will support communications between communication device 110 and computer system 120, in accordance with an embodiment of the present invention.

Communication device 110 comprises application(s) 112. Application(s) 112 includes at least one of any application that accesses information on computer system 120 for the purpose of retrieving or managing data from one or more document-oriented database(s).

In one embodiment of the present invention, computer system 120 comprises join manager 122 and document database 136. Join manager 122 comprises user interface 124, join creator 126, expansion terms store 128, conflict processor 130 and join substitution store 132. Join manager 122 further comprises any combination of commercial or custom software products associated with operating and maintaining join manager 122. It should be noted that, join manager 122 can be implemented as an Application Program Interface (API), a program module, a stand-alone program or other device. Further, join manager 122 can be implemented as an integrated or distributed application.

In one embodiment of the present invention, user interface 124 can be a plurality of user interfaces 124 within join manager 122. User interface 124 receives input to initiate a join operation, outputs common attribute join conflicts, common attribute join conflict resolution actions and receives user action choices to resolve common attribute join conflict(s). User interface 124 receives and outputs data in predefined formats and content based on implementation needs.

Join creator 126 processes input received from user interface 124 to search document database 136 for common and closely matching attributes to complete a table and/or database join. Embodiments of the present invention comprises at least one of, string search (exact match), expansive search, character search and nested search. Results of each search can produce multiple combinations to join attributes and join creator 126 identifies those occurrences as common attribute join conflicts. Join creator 126 sends common attribute join conflicts toward conflict processor 130 for resolution. When conflict processor 130 resolves common attribute join conflicts, join creator 126 retrieves joined data from document database 136 based on results attributes specified from user interface 124. Join creator 126 produces a virtual table of results based on attributes requested from user interface 124.

In one embodiment of the present invention, expansion terms store 128 can be a plurality of expansion terms stores 128 within join manager 122. In other embodiments of the present invention, expansion terms store 128 can be a combination of expansion terms stores 128 distributed between communication device 110 and computer system 120. Expansion terms store 128 contains a list of synonyms to replace search attributes used during a join. For example, an attribute name of 'PAN' can also be 'Permanent Account Number' in other database instances. Join creator 126 uses expansion terms store 128 to conduct expansive and nested searches. It should be noted that a user can edit (add, remove, change) expansion terms store 128 and administrative function is based on implementation needs.

In one embodiment of the present invention, conflict processor 130 can be a plurality of conflict processors 130 within join manager 122. Conflict processor 130 creates a list of common attribute join conflicts identified by join creator 126. Conflict processor 130 searches join substitution store 132 for existing similar joins conflicts resolution actions, combines matching common attribute join conflicts and sends the list toward user interface 124. When a user chooses actions to resolve common attribute join conflicts provided by user interface 124, conflict processor 130 records those actions to join substitution store 132. In an embodiment of the present invention, when a single conflict action matches an existing action in join substitution store 132, the existing join can be automatically selected without user interface 124 interaction.

In one embodiment of the present invention, join substitution store 132 can be a plurality of join substitution stores 132 within join manager 122. Join substitution store 132 contains a history of common attribute join conflict actions taken. Conflict processor 130 uses join substitution store 132 to retrieve common attribute join conflict resolution actions that match common attribute join conflicts processed by conflict processor 130. For example, join substitution store 132 could contain a former join depicting "table2A.office_number=table2B.phone_number.office_number."

The aforementioned example join can be used as a join solution during join conflict resolution.

FIG. 2A depicts a sample JavaScript Object Notation (JSON) database for an example joining operation, in accordance with an embodiment of the present invention. It should be noted that embodiments of the present invention are described with reference to JSON but embodiments of the present invention are not limited to JSON. JSON data structure is one of many data standards that describes document-oriented database data structure on which embodiments of the present invention operate. The JSON database A 200 represents one aspect of JSON basic schema that can be contained in document database 136. The JSON database in FIG. 2A is a single level data record encapsulated by curly brackets "{ }". Fields 202 Firstname, 204 lastname, 206 address, 208 office_number, 210 residence_number and 212 permanent_account_number are field value pairs. Each field value pair is delimited by a colon ":" and each unique field value pair is separated by a comma ",". Delimiters and separator characters are predetermined by each specific document database 136 data standard. It should be noted that field value pair is a term used to describe JSON data construct whereas a 'field' can be identified as an 'attribute'.

FIG. 2B depicts a sample nested JSON database for an example joining operation, in accordance with an embodiment of the present invention. The JSON database B 220 represents one aspect of JSON nested schema that can be contained in document database 136. The JSON database in FIG. 2B is a multiple level data record where each field value pair level is encapsulated by curly brackets "{ }". Fields 222 name and 226 phone_number are nested groupings of more specific field values pair. Fields 224 address and field 230 pan are field value pairs at the top level of the hierarchical data structure. Field 228 home_number is a nested field value pair at a first level of 226 phone_number.

Embodiments of the present invention will use string, expansive, character, and nested search to match fields depicted in FIG. 2A with FIG. 2B. Fields 202 Firstname and

204 Lastname match with field names identified within nested field 222 name using a nested search. Note, firstname is in lower case in field 222 name where field 202 Firstname is mixed case. In this example, a character search can resolve a match for field 202 within a nested search. Likewise, field 204 Lastname in mixed case can use character or expansive search to match field 222 l_name (short form for last name). Field 206 address can match field 224 address using exact match string search. Field 208 office_number and 210 residence_number can match to fields nested in field 226 phone_number noting that a character or expansive search can match field 210 residence_number with field 228 home_number. Field 212 permanent_account_number can match field 230 pan using expansive search.

Figure 3:
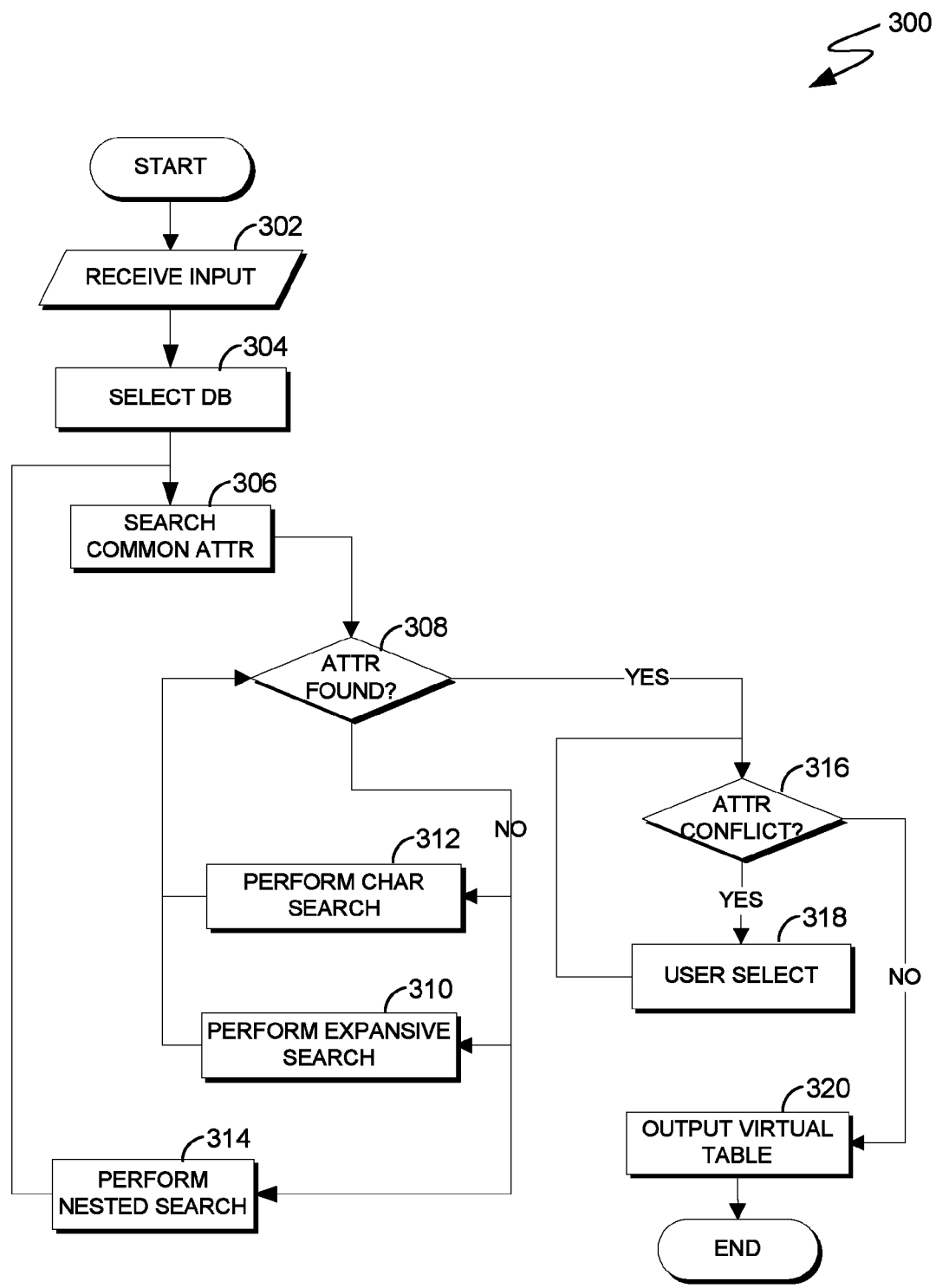
FIG. 3 is a flowchart depicting join manager logic flow, in accordance with an embodiment of the present invention.

FIG. 3 is a flowchart depicting join manager logic flow, in accordance with an embodiment of the present invention. Step 302 receive input in flow diagram 300 join manager operation is an interfacing function that captures requests to process joining of database fields. Input parameters are received such as, but not limited to, database name(s), common attribute(s) to search on and results attribute(s) to return from an application(s) 112 join request. It should be noted that assignment of a database as core and a database as target are predetermined based on input parameters from step 302 receive input. A core database is the primary database that a target database is joined. Further, the core database common attribute(s) names are specified exactly from step 302 receive input whereas target database common attribute(s) names can be inexact and assist join searching.

Step 304 select db reads each database structure to begin a join based on the provided database identifiers from step 302 receive input.

Step 306 search common attr performs a string search to find an exact attribute name match between the core database and one or more target databases using the common attribute(s) based on the provided identifiers from step 302 receive input. For example, target field 224 address (FIG. 2B) exactly matches core table field 206 address (FIG. 2A).

Step 308 attr found is a verification that core and target database tables are joined properly. If a join was not completed, (e.g., field attribute was not found in the target database) then other search methods are executed. Other search methods comprise expansive, character and nested search. For each search method conducted, step 308 attr found checks respective search results to determine if another method can be used. It should be noted that processing sequence and/or execution of all search methods is not mandatory. It should be further noted, some embodiments of the present invention could be optimized by limiting how many search methods are executed to find potential join attributes.

Step 310 perform expansive search is executed when step 308 attr found is 'no'. Step 310 perform expansive search searches expansion terms store 128 for alternate attribute name(s) of the common attribute(s) provided from step 302 receive input. The common attribute is expanded if there is an existing expansive form for that attribute in expansion terms store 128 and a string search is conducted, similar to step 306 search common attr. For example, core table field 212 permanent_account_number (FIG. 2A) can be found in expansion terms store 128 as target field 230 pan (FIG. 2B). Note, known expansion terms can be predetermined and/or updated/added by a user. If there are more than one matching attributes found, then a common attribute join conflict is noted. Step 310 perform expansive search results are sent toward step 308 attr found.

Step 312 perform char search is executed when step 308 attr found is 'no'. Step 312 perform char search searches for partial matches of the common attribute(s) provided from step 302 receive input. The common attribute is searched for a partial string commonality with other attributes in the database. The partial search is performed to find a closely matching attribute. For example, target nested field 222 name (FIG. 2B) contains l_name and character search can identify a match with base field 204 lastname (FIG. 2A). If there are more than one matching attributes found, then a common attribute join conflict is noted. Step 312 perform char search results are sent toward step 308 attr found.

Step 314 perform nested search is executed when step 308 attr found is 'no'. Step 314 perform nested search traverses each level of the database schema tree and progressively conducts step 306 search common attr, step 310 perform expansive search and step 312 perform char search to find common attribute matches. For example, target field 228 home_number (FIG. 2B) can match core field 210 residence_number (FIG. 2A) using step 310 perform expansive search within step 314 perform nested search. If there are more than one matching attributes found, then a common attribute join conflict is noted. Step 314 perform nested search results are sent toward step 308 attr found.

When Step 308 attr found is 'yes', then step 316 attr conflict determines if more than one matching attributes was noted as a common attribute join conflict based on results of at least one of, step 310 perform expansive search, step 312 perform char search and step 314 perform nested search processing. If step 316 attr conflict is 'yes', then step 318 user select is conducted. If step 316 attr conflict is 'no', then step 320 output virtual table is conducted.

Step 318 user select presents noted common attribute join conflicts to a user for resolution action. In addition, step 318 user select searches join substitution store 132 for historic common attribute join conflict resolution actions that can exist for each noted common attribute join conflict. The historic common attribute join conflict resolution actions can be presented to the user with the list of noted common attribute join conflicts for the user to select an action choice and resolve each noted common attribute join conflict. Once the user has resolved each common attribute join conflict, step 318 user select stores the common attribute join conflict resolution action decision in join substitution store 132 and step 320 output virtual table is conducted. It should be noted, in some embodiments of the present invention, a single common attribute join conflict could have a closely matching attribute. In this case, the closely matching attribute can be selected automatically by step 318 user select logic and the join operation can continue without the user selection of a resolution action.

Step 320 output virtual table is the results set of the joined data retrieved from document database 136 using core database attributes and the replaced target database attributes in join substitution store 132. Join substitution store 132 is used to replace joining attributes resulting from at least one of the completed string, expansive, character and nested searches. Application(s) 112 requesting joined output from join manager 122 is provided output by a predetermined method and format based on implementation needs.

Figure 4:
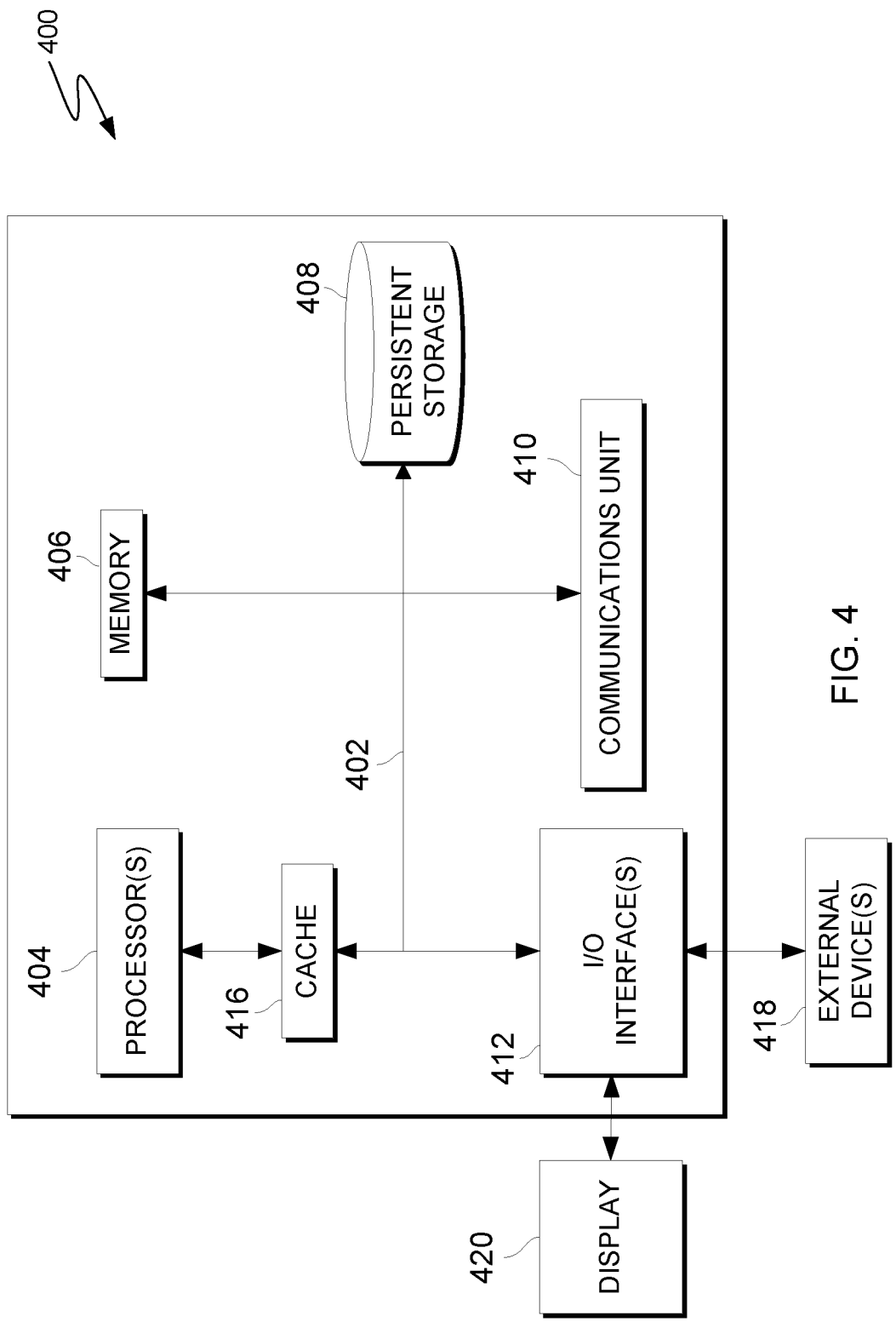
FIG. 4 depicts a block diagram of components of the server and/or the computing device, in accordance with an embodiment of the present invention.

FIG. 4 depicts a block diagram of components of communication device 110 and computer system 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for joining operations on document-oriented databases, the computer system comprising:
   one or more computer processors;
   one or more non-transitory computer readable storage media;
   program instructions stored on the one or more computer non-transitory readable storage media for execution by at least one of the one or more computer processors, the program instructions comprising:
      program instructions to, receive a plurality of database identifiers for joining each of a core database and one or more target databases;
      program instructions to, identify the core database and the one or more target databases based on the plurality of database identifiers, respectively;
      program instructions to, receive one or more common attributes associated with the core database;
      program instructions to, receive one or more results attributes for generating combined join results;
      program instructions to, search for the one or more common attributes and the one or more results attributes in the core database and the one or more target databases, wherein searching comprises:
         program instructions to, determine a replacement attribute for at least one of the one or more common attributes based on one or more join substitution data stores, and the searching further comprises:
         one of one or more string search, one or more character search, one or more expansive search wherein the one or more expansive search comprises searching based on the replacement attribute, the replacement attribute determined based on one or more expansion terms data stores, and one or more nested search traversing a core database schema levels and one or more target databases schema levels, using the one or more string search and at least one of the one or more character search and the one or more expansive search;
      program instructions to, update the one or more join substitution data stores by receiving input to resolve one or more common attribute join conflicts;
      program instructions to, update the one or more expansion terms data store based on user input;

program instructions to, identify the one or more common attribute join conflicts wherein the one or more common attribute join conflicts comprise multiple combinations to join attributes;
program instructions to, create one or more choices for each of the one or more common attribute join conflicts based on searching for one or more matching join conflict resolutions in the one or more join substitution data stores based on each of the one or more common attribute join conflicts and one or more matching join conflict resolutions;
program instructions to, output the one or more choices for one or more choice selections;
program instructions to, receive the one or more choice selections as a second one or more common attribute join conflict resolutions, to resolve the one or more common attribute join conflicts;
program instructions to, store the second one or more common attribute join conflict resolutions in the one or more join substitution data stores; and
program instructions to, output one or more virtual tables wherein the one or more virtual tables comprises the combined join results based on the one or more common attributes and the one or more results attributes from the core database and the one or more target databases.

* * * * *